United States Patent [19]

Mineck

[11] 4,100,898

[45] Jul. 18, 1978

[54] COMBINATION CRANKCASE VENTILATION VALVE AND SUPPLEMENTARY CARBURETOR

[75] Inventor: Fred Mineck, Phoenix, Ariz.

[73] Assignees: Dorothy J. Archer, Phoenix, Ariz.; Jay A. Mineck, Montclair, Calif.; Warren F. B. Lindsley, Phoenix, Ariz.; part interest to each

[21] Appl. No.: 800,727

[22] Filed: May 26, 1977

[51] Int. Cl.² ............................................. F02M 25/06
[52] U.S. Cl. ........................... 123/119 B; 173/119 D; 173/141
[58] Field of Search ............... 123/119 B, 141, 124 R, 123/119 D; 137/480

[56] References Cited

U.S. PATENT DOCUMENTS

| 1,380,974 | 6/1921 | Kettering | 123/119 B |
| 1,735,694 | 11/1929 | Remington | 123/119 B |
| 1,760,272 | 5/1930 | McCuen | 123/119 B |
| 1,777,656 | 10/1930 | Silva | 123/119 B |
| 1,847,452 | 3/1932 | Vaughn | 123/119 B |
| 1,869,262 | 7/1932 | Kennedy | 123/119 B |
| 3,176,670 | 4/1965 | Sinibaldi | 123/119 B |
| 3,362,386 | 1/1968 | McMahon | 123/119 B |
| 3,753,304 | 8/1973 | Hughes | 123/119 B UX |
| 3,889,649 | 6/1975 | Polaner | 123/119 B |

*Primary Examiner*—Wendell E. Burns
*Attorney, Agent, or Firm*—Warren F. B. Lindsley

[57] ABSTRACT

A combination crankcase ventilation and supplementary carburetor device for crankcase emissions of an internal combustion engine which aerates these emissions in a swirling manner and with the aid of air injected into this swirling stream through venturi action renders the crankcase emissions combustible.

13 Claims, 8 Drawing Figures

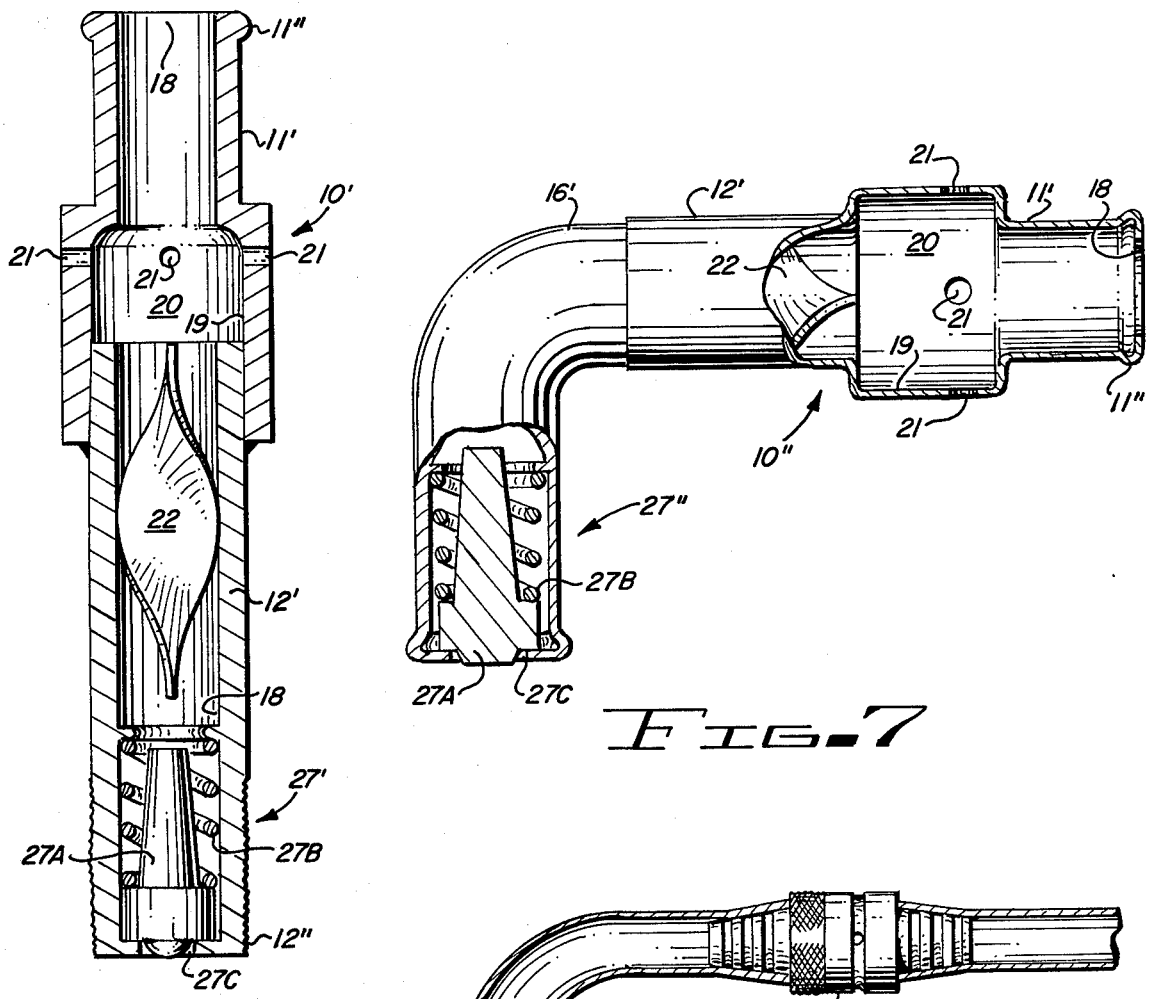

COMBINATION CRANKCASE VENTILATION VALVE AND SUPPLEMENTARY CARBURETOR

BACKGROUND OF THE INVENTION

The purpose of the supplementary carburetor is to utilize the crankcase emissions which are normally vented out of the engine into the atmosphere. Since the P.C.V. system (Positive Crankcase Ventilation) for internal combustion engines was incorporated in the internal combustion engine, the emissions from the crankcase, consisting of blow-by gases that originate in the cylinders, pick up crankcase oil, carbon, moisture and harmful-type emissions and carry them directly to the intake manifold unbalancing the mixture of fuel and air which start from the gas tank through the carburetor on to the intake manifold and finally to the combustion chamber. When these emissions mix with the carburetor fuel/air mixture in the intake manifold, it unbalances the ratio of fuel to air. Consequently, when the crankcase emission enters the combustion chamber and firing takes place, the heavy hydrocarbons (which are primarily combustible crankcase oil) do not burn sufficiently under normal firing conditions and consequently, form carbon in the cylinders and on the valves and spark plugs. To combat harmful emissions that become photosynthesis smog, there have been many types of emission control devices combined with the internal combustion engines, the latest being the catalytic converter which cuts down the oxides of nitrogen, carbon monoxide and hydrocarbons expelled into the atmosphere. The combination of these various types of emission controls with the internal combustion engines have reduced their efficiency and in many instances have caused them to use more fuel and have caused inferior performance of these vehicles such as rough running and hesitation on acceleration from a stop or at various other speeds.

DESCRIPTION OF THE PRIOR ART

Attempts have been made to more effectively utilize the crankcase emission, and a commercial product known as a condensator is marketed by Condensator, Inc. of Sacramento, California. This device, however, condenses out in a catalytic separator the heavier oil products of the crankcase emissions rather than burning them to obtain their valuable fuel content. Further, in addition to the undesirable complexity of this device, the catalytic separator must be periodically cleaned at approximately every 4,000 miles.

SUMMARY OF THE INVENTION

In accordance with the invention claimed, an improved and greatly simplified device is provided embodying a crankcase ventilation valve and a supplementary carburetor in a unitary structure for effectively disposing of an utilyzing crankcase emissions of internal combustion engines.

It is, therefore, one object of this invention to provide an improved simplified device including a control valve and carburetor for crankcase emissions.

Another object of this invention is to provide a combination crankcase ventilation valve and supplementary carburetor device for incorporation in the P.C.V. system (Positive Crankcase Ventilation) of the modern automobiles.

A further object of this invention is to provide a new and improved device for the crankcase ventilation system on an internal combustion engine which swirls the crankcase emission and mixes the swirled mixture with air to render it combustible.

A still further object of this invention is to provide an improved combination ventilation valve and supplementary carburetor for crankcase emission which utilizes venturi action to aerate said emission before transmitting it to the intake manifold of an internal combustion engine.

A still further object of this invention is to provide a new and improved crankcase ventilation system employing a supplementary carburetor for crankcase emissions of an internal combustion engine which is much simpler in construction than any known device.

A still further object of this invention is to provide an improved supplementary carburetor for use with and in combination with a crankcase ventilation valve for crankcase emissions having no moving parts.

A still further object of this invention is to incorporate in the design of the crankcase ventilation system a supplementary carburetor employing a venturi which insures a high speed air stream for crankcase emissions created at all engine speeds.

A still further object of this invention is to provide an improved supplementary carburetor for crankcase emissions with effective air mixing capabilities yielding more finely divided fuel droplets than heretofore possible.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 4A is an enlarged cross-sectional view of the P.V.C. system with the supplementary carburetor separate from the crankcase ventilation valve and shown in a suitable position in the line;

FIG. 5 is an enlarged view of the deflector plate forming a part of the supplementary carburetor;

FIG. 6 is a cross-sectional view of a unitary device embodying the crankcase ventilation valve and the supplementary carburetor and disclosing the invention; and FIG. 7 is a modification of the device shown in FIG. 6.

DESCRIPTION OF THE PREFERRED EMBODIMENT

Figure 1:
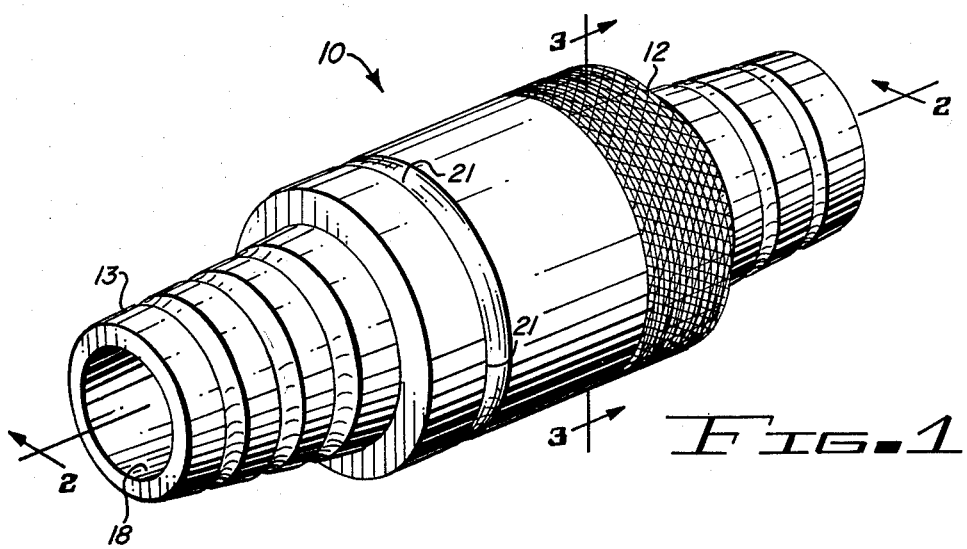
FIG. 1 is a perspective view of an improved supplementary carburetor for a crankcase ventilation system.

Referring more particularly to the drawing by characters of reference, FIGS. 1, 2, 3 and 5 discloses a valve or supplementary carburetor 10 comprising an elongated tubular housing which may have a torpedo configuration formed by two telescopically fitting parts 11 and 12. Each of these parts are provided with tapered ends 13 and 14 at their non-mating ends which may be provided with ridges or grooves 15 or the like to form gas tight seals with hose 16 forming a part of the ventilator valve hose connection 17 shown in FIG. 4.

Figure 2:
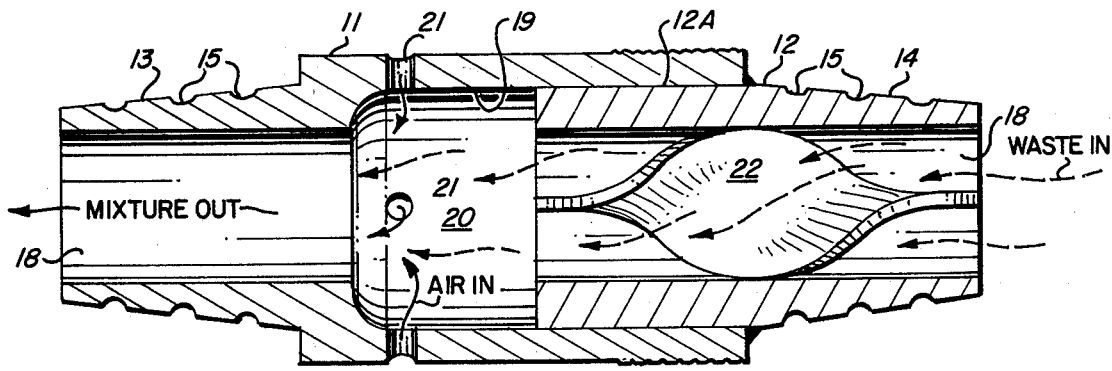
FIG. 2 is a cross-sectional view of FIG. 1 taken along the line 2—2.

As shown in FIG. 2, the telescopic mating parts 11 and 12 of the carburetor are each provided with substantially the same diameter bore 18 at their tapered nozzle ends 13 and 14 with part 11 formed to provide a larger bore 19 at its mating end for receiving therein the outer periphery of the cylindrical portion 12A of part 12. Part 12 is inserted into bore 19 of part 11 a predetermined distance such as shown in FIG. 2 providing an air and crankcase gas emission mixing chamber 20. The two parts 11 and 12 are securely fastened in this position by any suitable means, such as welding, soldering or swaging.

A plurality of apertures 21 are spacedly positioned around the periphery of part 11 of the housing for providing intake passages from the atmosphere air into chamber 20 formed by the particular telescopic connection of parts 11 and 12 of the carburetor.

Figure 3:
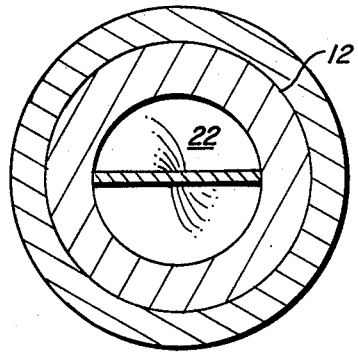
FIG. 3 is a cross-sectional view of FIG. 1 taken along the line 3—3.

As noted from FIGS. 2, 3, and 5 of the drawing, a vane-type deflector 22 is fixedly positioned in part 12 of the carburetor such that end 22A thereof is arranged in the plane of the mating end of part 12 with part 11 thereof. The other end 22B of the deflector 22 is arranged in the plane of the tapered end of part 12 with the deflector being twisted between its end approximately 360 degrees.

As noted from the drawings, deflector 22 has a width substantially equal to the internal diameter of the bore of part 12 and may be formed of any suitable material such as metal.

Thus, crankcase emission entering bore 18 of the tapered end 14 of part 12 is directed through a path which is swirled or twisted 360 degrees before entering chamber 20 of the carburetor.

In chamber 20, the crankcase emission gases are further agitated by the injection therein under suction and venturi action air from ports or apertures 21. The swirling crankcase emission gases impinged upon by atmospheric air drawn into chamber 20 through apertures 21 cause a turbulence which aerates the crankcase oil, carbon, moisture and other harmful type emissions so that they may be burned in the cylinders of the internal combustion engine.

Figure 4:
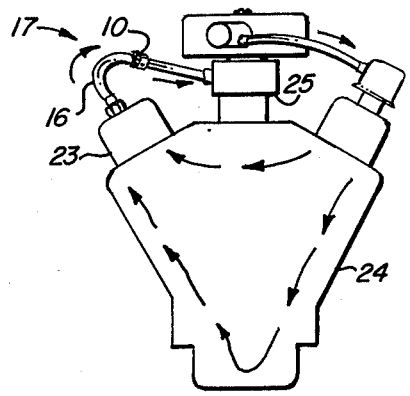
FIG. 4 is a diagrammatic view of an internal combustion engine illustrating the P.V.C. system connecting the manifold to the intake manifold of the internal combustion engine.

FIGS. 4 and 4A disclose one arrangement of the disclosed supplementary carburetor and crankcase ventilating valve assembly 27 in the ventilator valve hose 17 connecting the cylinder head cover 23 of a V-8 engine 24 with the intake manifold 25 of carburetor 26.

Thus, a new and improved supplementary carburetor or gaseous fumes mixing device is disclosed which fulfills a gap in the controls for automatic pollution. In addition, the claimed device increases the mileage of present day automobiles by utilizing more effectively crankcase emission fumes by creating a small tornado in the fumes prior to their injection in the intake manifold of the internal combustion engine rendering them more burnable than heretofore possible. This results in smoother engine performance, easier starting conditions for warm and cold engine starts and helps control dieseling after engine operation.

As shown in FIGS. 6 and 7, the supplementary carburetor 10 and the crankcase ventilating valve assembly may be combined into a single housing or unitary structure thereby forming a device which may be readily connected by suitable hose means in a ventilating system between an outlet port of the crankcase and an inlet port of the manifold of an internal combustion engine.

In FIG. 6, the supplementary carburetor 10' is combined into a housing with the crankcase ventilating valve assembly 27'. The housing of the unitary structure is formed of two parts 11' and 12' with the non-mating end being provided with a flange 11'', if so desired, for receiving thereover a hose 16 which may be clamped thereto. The non-mating end 12'' of part 12' may be threadedly connected into an outlet port in the crankcase of an internal combustion engine in the usual manner.

As shown in FIG. 6, the crankcase ventilating valve assembly 27' is mounted within the non-mating end of part 12' and comprises the known valve element 27A biased by a spring 27B toward an aperture 27C in the non-mating end of part 12'.

Under non-mating conditions of an associated engine, i.e. when crankcase fumes are not directed into the housing, the spring 27B biases valve element 27A toward the non-mating end of part 12' to close aperture 27C forming the inlet port of the housing, as shown in FIG. 6.

FIG. 7 is a modification of the structure shown in FIG. 6 wherein the unitary structure comprises a firm prebent housing 16' for the valve assembly 27'' embodying the components 27A, 27B and 27C shown in FIG. 6.

It should be noted that the non-mating ends of the unitary device in which the crankcase ventilating valve assembly is mounted may be formed to mate with the outlet port of the crankcase in any suitable manner. Accordingly, the FIGS. 4A, 6 and 7 show different ways this interconnection may be accomplished without limiting the claimed device to any particular connection configuration.

Although but a few embodiments of the invention have been illustrated and described, it will be apparent to those skilled in the art that various changes and modifications may be made therein without departing from the spirit of the invention or from the scope of the appended claims.

What is claimed is:

1. A device for ventilating and aerating crankcase gaseous fumes before transmitting said fumes to the manifold of an internal combustion engine comprising:

a tubular housing, one end of said housing defining an intake port and the other end of said housing defining an outlet port, said housing defining therewithin a gaseous fume mixing chamber, a plurality of openings spacedly positioned around the periphery of said housing forming air inlet ports interconnecting atmospheric air with the interior of said chamber, a deflecting vane mounted within said housing for swirling the gaseous fumes received through said intake port and discharging said swirling gases into said chamber, wherein the swirling gaseous fumes are aerated by air injected into said swirling gaseous fumes prior to discharge out of said outlet port, and a valve assembly, said assembly being mounted within said intake port of said housing for receiving and venting through said housing the crankcase fumes, said outlet port of said housing being connectable to an intake manifold of the internal combustion engine.

2. The device set forth in claim 1 wherein:
said housing has an elongated tubular configuration.

3. The device set forth in claim 1 wherein:
said housing comprises two interconnected axially arranged parts with one part containing said chamber and the other part containing said valve assembly.

4. The device set forth in claim 1 wherein:
said vent valve assembly comprises a one way valve.

5. The device set forth in claim 1 wherein:
said valve assembly comprises a valve element, and spring means for normally biasing said valve element to close said intake port to said housing when gaseous fumes of an internal combustion engine are not directed into said intake port.

6. The device set forth in claim 1 wherein:
said one end of said housing is provided with means for connecting with a vent port of the crankcase of an internal combustion engine.

7. The device set forth in claim 1 wherein:
said housing comprises at least two telescopical interconnected parts.

8. The device set forth in claim 1 wherein:
said chamber is positioned in said housing immediately downstream of said deflecting vane.

9. The device set forth in claim 1 wherein:
said deflecting vane deflects the gaseous fumes received at the intake port substantially 360° before discharging it into said chamber.

10. The device set forth in claim 1 wherein:
said vane comprises a metallic member the width of which is substantially the diameter of the bore of said first part.

11. The device set forth in claim 10 wherein:
said vane is of a rigid metallic configuration.

12. The device set forth in claim 1 wherein:
said mixing chamber has a bore diameter greater than the bore of the intake and outlet ports of said housing.

13. The device set forth in claim 1 wherein:
the periphery of said mixing chamber tapers into the bore of said outlet port which together with said air inlet ports forms a venturi for further aerating said swirling gaseous fumes.

* * * * *